United States Patent
Ohira et al.

(10) Patent No.: US 8,107,734 B2
(45) Date of Patent: Jan. 31, 2012

(54) IMAGE PROCESSING APPARATUS, AND METHOD FOR PERFORMING DOCUMENT MATCHING USING EXTRACTED FEATURE POINTS OF CONNECTED IMAGE COMPONENTS

(75) Inventors: Masakazu Ohira, Nara (JP); Atsuhisa Morimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1284 days.

(21) Appl. No.: 11/790,646

(22) Filed: Apr. 26, 2007

(65) Prior Publication Data
US 2007/0253623 A1 Nov. 1, 2007

(30) Foreign Application Priority Data
Apr. 28, 2006 (JP) ................................. 2006-126761

(51) Int. Cl.
*G06K 9/46* (2006.01)
(52) U.S. Cl. ........................................................ 382/190
(58) Field of Classification Search .................. 382/173, 382/190, 223
See application file for complete search history.

(56) References Cited

U.S. PATENT DOCUMENTS

| | | | |
|---|---|---|---|
| 5,465,353 A | 11/1995 | Hull et al. | |
| 6,011,635 A * | 1/2000 | Bungo et al. | 358/488 |
| 6,477,282 B1 * | 11/2002 | Ohtsuki et al. | 382/266 |
| 7,701,614 B2 * | 4/2010 | Yamazaki | 358/3.03 |

FOREIGN PATENT DOCUMENTS

| | | |
|---|---|---|
| JP | 61-260370 A | 11/1986 |
| JP | 7-175925 A | 7/1995 |
| JP | 10-79035 A | 3/1998 |
| WO | WO-2006/092957 A1 | 9/2006 |

OTHER PUBLICATIONS

Nakai, T., et al. "Document Image Retrieval Based on Cross-Ratio and Hashing", Technical Report of the Institute of Electronics, Information and Communication Engineers pp. 1-6, English Translation.
Nakai, T., et al. "Document Image Retrieval Based on Cross-Ratio and Hashing", Technical Report of the Institute of Electronics, Information and Communication Engineers pp. 1-6 Mar. 2005.

\* cited by examiner

*Primary Examiner* — Brian Q Le
*Assistant Examiner* — Edward Park
(74) *Attorney, Agent, or Firm* — Birch, Stewart, Kolasch & Birch, LLP

(57) ABSTRACT

Pixels of a binary image obtained by binarizing an image are scanned in a predetermined direction, labels are assigned to the pixels according to binarization information about the respective pixels, information about the assigned labels is stored sequentially for each of a plurality of lines along the predetermined direction, information about coordinate values in the binary image of pixels assigned the same label is stored, a determination is made as to whether or not, in a current line among the plurality of lines, there is a pixel assigned the same label as a label assigned to a pixel contained in a line which was scanned immediately before the current line, when a determination is made that there is no pixel assigned the same label, a feature point in a connected component formed by connecting together pixels specified by the coordinate values is calculated based on the stored information about the coordinate values, a feature vector representing a feature of the image is calculated based on the calculated feature point, and a similarity to reference image is determined based on the calculated feature vector.

19 Claims, 17 Drawing Sheets

FIG.4

| -3 | -3 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

FIG.6

| PIXEL BLOCK A1 | PIXEL BLOCK A2 | ········ | PIXEL BLOCK A28 |
|---|---|---|---|
| | | | |
| (1, 1) | (1, 2) | ········ | (1, 28) |
| (2, 1) | (2, 2) | ········ | (2, 28) |
| ⋮ | ⋮ | ········ | ⋮ |
| (128, 1) | (128, 2) | ········ | (128, 28) |

| LABEL | TABLE VALUE |
|---|---|
| 1 | 1 |
| 2 | 2 |
| 3 | 1 |
| ⋮ | ⋮ |

FIG.10

| LABEL | NUMBER OF PIXELS | SUM OF X COORDINATE VALUE | SUM OF Y COORDINATE VALUE | FLAG (AVAILABLE/PROCESSED /UNPROCESSED) |
|---|---|---|---|---|
| 1 | 9 | 38 | 42 | UNPROCESSED |
| 2 | 4 | 46 | 24 | UNPROCESSED |
| .... | .... | .... | .... | .... |

| LABEL | FLAG |
|---|---|
| 1 | PROCESSED |
| 2 | PROCESSED |

FIG.11B

| LABEL | FLAG |
|---|---|
| 1 | UNPROCESSED |
| 2 | UNPROCESSED |

FIG.11C

| LABEL | FLAG |
|---|---|
| 1 | UNPROCESSED |
| 2 | PROCESSED |

FIG.17A

| HASH VALUE | INDEX REPRESENTING DOCUMENT |
|---|---|
| H1 | ID1 |
| H2 | ID1 |
| H3 | ID1, ID2 |
| H4 | ID1 |
| H5 | ID1 |
| H6 | ID1, ID2 |
| ... | ... |

FIG.17B

| HASH VALUE | INDEX REPRESENTING DOCUMENT |
|---|---|
| H1 | ID1, ID1 |
| H2 | ID1 |
| H3 | ID1, ID2 |
| H4 | ID1 |
| H6 | ID1, ID2 |
| ... | ... |

IMAGE PROCESSING APPARATUS, AND METHOD FOR PERFORMING DOCUMENT MATCHING USING EXTRACTED FEATURE POINTS OF CONNECTED IMAGE COMPONENTS

CROSS-REFERENCE TO RELATED APPLICATION

This non-provisional application claims priority under 35 U.S.C. §119(a) on Patent Application No. 2006-126761 filed in Japan on Apr. 28, 2006, the entire contents of which are hereby incorporated by reference.

BACKGROUND OF THE INVENTION

1. Field of the Invention

The present invention relates to an image processing apparatus for determining a similarity to pre-registered images, based on the feature vector obtained from an acquired image, and also relates to an image forming apparatus and an image reading apparatus comprising the image processing apparatus, and an image processing method.

2. Description of Related Art

As image processing in which a document is read with a scanner, and image data obtained by reading the document is matched with pre-registered image data to determine a similarity between images, there are proposed some methods such as, for example, a method in which a key word is extracted from an image by an OCR (Optical Character Reader) and a similarity between images is determined based on the extracted keyword; and a method which limits images whose similarity is to be determined to form images with ruled lines, and extracts features of the ruled lines to determine a similarity between images.

However, in these determination processes, in order to accurately determine a similarity between images, it is necessary to correct skew of a document to be read (skew correction), and, if the skew correction can not be made, there is the problem that a similarity between images is not accurately determined. Moreover, since the processing to determine a similarity between images is complicated, it is difficult to realize the processing as hardware. When the similarity determining process is realized by a simple algorism, it can be easily realized as hardware. However, it is difficult to improve the determination accuracy, and there is also the problem that tolerance to skew or external disturbance such as noise is insufficient.

Hence, there is proposed, for example, a method (Nakai Tomohiro and three others, "Document Image Retrieval Based on Cross-Ratio and Hashing", The Institute of Electronics, Information and Communication Engineers Technical Research Report, March, 2005) which calculates the centroid of connected components in a document image, extracts the calculated centroid as a feature point of the connected components, and calculates an invariant with respect to the rotation or skew of the image based on the extracted feature point to determine a similarity between images, thereby capable of accurately determining a similarity between images even when a target image is skewed or includes writing that is not contained in a pre-registered image.

As a method for calculating the centroid of an image pattern, there is proposed an image processing method capable of calculating the centroid coordinates at high speed by dividing a circumscribed rectangular region enclosing a target pattern into a plurality of blocks by considering a pixel matrix as one unit, defining the relative origin and relative coordinates for each block, and performing predetermining processing on each block (see Japanese Patent Application Laid-Open No. 61-260370).

Moreover, as an apparatus for calculating the centroid of a specific pattern in an image, there is proposed an apparatus capable of calculating the centroid at high speed by setting a circumscribed square on a specific target object and extracting the region and the centroid value of the set specific target object in parallel (see Japanese Patent Application Laid-Open No. 10-79035).

However, in the method disclosed in the above-mentioned non-patent document "Document Image Retrieval Based on Cross-Ratio and Hashing", when calculating the centroid of the connected components, image data on one page is read and stored, the stored image data on one page is binarized, a label assigning process is performed to show in which connected component each pixel is contained, the coordinate values of the pixels contained in a connected component are added up for each connected component, and the sum of the coordinate values is divided by the number of the pixels contained in the connected component to calculate the centroid of the connected component. Therefore, in order to calculate the centroid, it is necessary to store one page of image data. For example, when realizing the image processing by an ASIC, if the memory capacity increases, the number of gates also increases, and consequently the circuit scale becomes larger, the realization of the image processing as hardware of realistic scale is difficult, and the cost rises.

In the method disclosed in Japanese Patent Application Laid-Open No. 61-260370, when obtaining image data from a scanner, the image data is inputted from the scanner on a line-by-line basis, and therefore line buffers corresponding to the number of lines contained in a block are required to perform the processing on a block-by-block basis. Hence, when performing the processing by using a relatively large block, there is the problem that a large memory is necessary. Further, in the apparatus disclosed in Japanese Patent Application Laid-Open No. 10-79035, there is the problem that the shape of a connected component from which the centroid can be calculated is limited.

BRIEF SUMMARY OF THE INVENTION

The present invention has been made with the aim of solving the above problems, and it is an object of the invention to provide an image processing apparatus capable of performing labeling and feature point extraction simultaneously, capable of reducing a required memory capacity compared to a prior art, capable of being realized as hardware, and capable of determining a similarity between images at high speed by storing labels of pixels contained in a plurality of lines along a predetermined scanning direction, determining whether or not a pixel contained in a current line among the plurality of lines was assigned the same label as a label assigned to a pixel contained in a line which was scanned immediately before the current line, and, when determined that the same label was not assigned, extracting a feature point in a connected component where the pixels assigned the same label are connected together, and to provide an image forming apparatus and an image reading apparatus comprising the image processing apparatus, and an image processing method.

Another object of the invention is to provide an image processing apparatus which comprises adding means for adding up the coordinate values of pixels assigned the same label when determined that the same label was assigned, and means for storing, in association with each label, the sum of the coordinate values of the pixels assigned the label, and performs labeling and feature point extraction simultaneously by extracting a feature point in a connected component where the pixels assigned the same label are connected together, based on the stored coordinate values and the number of the pixels contained in the connected component, and is thereby capable of reducing a required memory capacity compared to a prior art, capable of being realized as hardware, and capable of determining a similarity between images at high speed, and to provide an image forming apparatus and an image reading apparatus comprising the image processing apparatus.

Still another object of the invention is to provide an image processing apparatus which comprises binarizing means for calculating a threshold value for each pixel block composed of a plurality of pixels of an image, based on luminance values or lightness values of the pixels contained in the pixel block, and binarizes the image in the pixel block for which the threshold value was calculated, based on the calculated threshold value, and is thereby capable of being realized as hardware and capable of accurately determining a similarity between images by actively calculating a threshold value for binarization and stably specifying a connected component, and to provide an image forming apparatus and an image reading apparatus comprising the image processing apparatus.

Yet another object of the invention is to provide an image processing apparatus which comprises means for calculating a statistic value of luminance values or lightness values based on the luminance values or lightness values of pixels obtained by scanning pixels in a pixel block in a predetermined direction, and means for storing the statistic value calculated for each scanning direction in the pixel block, and calculates the threshold value based on the statistic value of each of the scanning direction in the pixel block, and is thereby capable of performing the threshold calculation for a binarizing process and the binarization of the image in parallel for each pixel block by simply storing the statistic value of each of the lines in the pixel block, and to provide an image forming apparatus and an image reading apparatus comprising the image processing apparatus.

A further object of the invention is to provide an image processing apparatus capable of accurately determining a similarity between images by removing high frequency components, which are not necessary to determine a similarity between images, by binarizing an image processed by means for performing a spatial filtering process to correct the spatial frequency characteristics of the image, and correcting degradation of the image depending on the characteristics of input apparatuses even when different image input apparatuses are used when registering image data and when matching image data, and to provide an image forming apparatus and an image reading apparatus comprising the image processing apparatus.

A further object of the invention is to provide an image processing apparatus capable of accurately determining a similarity between images even when the resolution is changed by the binarization of an image converted by means for converting the resolution of the image, and capable of reducing the amount of processing by performing the processing after converting the image into a lower resolution than the resolution read by the image input apparatus, and to provide an image forming apparatus and an image reading apparatus comprising the image processing apparatus.

An image processing apparatus according to the present invention is characterized by comprising: a label assigning section for scanning pixels of a binary image obtained by binarizing an image in a predetermined direction, and assigning labels to the pixels according to binarization information about the respective pixels; a label storing section for storing information about the assigned labels sequentially for each of a plurality of lines along the predetermined direction; a coordinate value storing section for storing information about coordinate values of pixels assigned the same label in the binary image; a determining section for determining whether or not, in a current line among the plurality of lines, there is a pixel assigned the same label as a label assigned to a pixel contained in a line which was scanned immediately before the current line; a feature point calculating section for calculating a feature point in a connected component where pixels specified by the coordinate values are connected together, based on the information about the coordinate values stored in the coordinate value storing section, when a determination is made that there is no pixel assigned the same label; a feature vector calculating section for calculating a feature vector representing a feature of the image based on the calculated feature point; and a similarity determining section for determining a similarity to reference image based on the calculated feature vector.

The image processing apparatus according to the present invention comprises a cumulative adder section for adding up the coordinate values of pixels assigned the same label when a determination is made that there is a pixel assigned the same label in the current line, wherein the feature point is calculated based on the information about the sum of the coordinate values and the number of the pixels assigned the same label.

The image processing apparatus according to the present invention is characterized by comprising a threshold value calculating section for calculating, for each pixel block composed of a plurality of pixels, a threshold value based on luminance values or lightness values of the pixels contained in the pixel block; and a binarizing section for binarizing the image in the pixel block based on the calculated threshold value.

The image processing apparatus according to the present invention is characterized in that a statistic value of luminance values or lightness values is calculated based on the luminance values or lightness values of pixels obtained by scanning the pixels in the pixel block in a predetermined direction, and the threshold value is calculated based on the calculated statistic value.

The image processing apparatus according to the present invention is characterized by comprising a spatial filter process section for performing a spatial filtering process to correct spatial frequency characteristics of an image, wherein the image whose spatial frequency characteristics were corrected by the spatial filter process section is binarized.

The image processing apparatus according to the present invention is characterized by comprising a resolution converting section for converting a resolution of an image, wherein the image whose resolution was converted by the resolution converting section is binarized.

An image forming apparatus according to the present invention is characterized by comprising: an image processing apparatus defined by the above-described invention; and an image forming section for forming on a sheet an image processed by the image processing apparatus.

An image reading apparatus according to the present invention is characterized by comprising: an image reading section for reading an image; and an image processing apparatus defined by the above-described invention for processing the image read in the image reading section.

An image processing method according to the present invention is characterized by scanning pixels of a binary image obtained by binarizing an image in a predetermined direction; assigning labels to the pixels according to binarization information about the respective pixels; storing information about the assigned labels sequentially for each of a plurality of lines along the predetermined direction; storing information about coordinate values image of pixels assigned the same label in the binary; determining whether or not, in a current line among the plurality of lines, there is a pixel assigned the same label as a label assigned to a pixel contained in a line which was scanned immediately before the current line; when a determination is made that there is no pixel assigned the same label, calculating a feature point in a connected component where pixels specified by the coordinate values are connected together, based on the stored information about the coordinate values; calculating a feature vector representing a feature of the image based on the calculated feature point; and determining a similarity to reference image based on the calculated feature vector.

In the present invention, a current pixel contained in a current line is scanned in a predetermined direction, a label is assigned to the current pixel based, for example, on the binarization information (for example, "1" or "0") about pixels which are within a predetermined range adjacent to the current pixel and contained in the current line and a line immediately before the current line, and the assigned label is stored. Note that when the current line is the first line of the binary image, a label is assigned based on the binarization information about the current pixel, the assigned label is stored, and similar processing is performed by taking the line next to the current line as a current line. Consequently, the labels of the pixels contained in the current line and the line immediately before the current line are stored.

When assigning a label by scanning a current pixel contained in a current line, a determination is made as to whether or not the same label as a label assigned to a pixel contained in the line immediately before the current line was assigned to a pixel contained in the current line. When a determination is made that the same label was not assigned, a determination is made that a connected component assigned the same label ends at the current line, and a feature point in the connected component where the pixels assigned the same label are connected together is extracted. Thus, labeling the current pixel contained in the current line and a determination as to whether or not the same label was assigned are performed in parallel. When the processing on the current pixel is finished, the next line is taken as a current line, and the same processing is repeated. Hence, by simply storing the labels for a plurality of lines (for example, two lines) of pixels, it is possible to label the binary image and extract the feature point in the connected component.

In the present invention, when assigning a label by scanning a current pixel contained in a current line, a determination is made as to whether or not the same label as a label assigned to a pixel contained in the line immediately before the current line was assigned to a pixel contained in the current line. When a determination is made that the same label was assigned, the coordinate values of the pixels assigned the same label (for example, the x coordinates and y coordinates of the pixels in the binary image) are added up, and the sum of the coordinate values are stored. Extracting means extracts a feature point in a connected component formed by connecting the pixels assigned the same label together, based on the sum of the coordinate values in the connected component and the number of the pixels contained in the connected component. For example, it is possible to extract the centroid of the connected component as a feature point by dividing the sum of the coordinate values by the number of the pixels. Thus, the shape of the connected component from which the feature point is extracted is not limited, and it is possible to accurately extract a feature point in an arbitrary pattern. Moreover, by simply storing the sum of the coordinate values in association with a label, it is possible to perform labeling of the binary image and the extraction of a feature point in the connected component (for example, calculation of the centroid of the connected component) in parallel.

In the present invention, for each pixel block composed of a plurality of pixels of an image, a threshold value is calculated based on the luminance values or lightness values of the pixels contained in the pixel block. Based on the calculated threshold value, the binarizing means binarizes the image in the pixel block for which the threshold value was calculated. It is thus possible to actively calculate a threshold value for binarization for each pixel block.

In the present invention, a statistic value (for example, a mean value) of luminance values or lightness values is calculated based on the luminance values or lightness values of the respective pixels obtained by scanning the pixels in a pixel block in a predetermined direction. The statistic value calculated for each scanning direction in the pixel block is stored, and a threshold value is calculated based on the statistic value stored for each scanning direction (for example, by further averaging the mean values if the statistic value is the mean value). By simply storing the statistic value for each line in a pixel block, it is possible to perform the calculation of the statistic value of the luminance values or lightness values of the pixels in a pixel block in the image and the binarization of the image in the pixel block in parallel for each pixel block.

In the present invention, the spatial frequency characteristics of an image are corrected before binarizing the image. For example, the spatial frequency characteristics of an image which may be caused by the difference in the optical characteristics of an image input apparatus for inputting an image (for example, an image reading apparatus) are corrected, and, even when a different image input apparatus is used, the degradation of the image (for example, blurred image) is restored. Moreover, high frequency components which are not necessary to extract feature points in the binary image are removed. In other words, the edge enhancement process and the smoothing process are performed on the image by the spatial filtering process.

In the present invention, the resolution of an image is converted before binarizing the image. For example, when the resolution of an image is magnified in an image input apparatus for inputting the image (for example, an image reading apparatus), the image is magnified again to a predetermined resolution. Therefore, even when the resolution is changed, it is possible to extract feature points in the binary image without being influenced by the change. When the predetermined resolution is set smaller than the resolution in reading the image in the image input apparatus, it is possible to reduce the amount of processing in the subsequent stage.

In the present invention, the labels of the respective pixels contained in a plurality of lines (for example, two lines) along a predetermined scanning direction are stored, and, when a determination is made that, among the pixels contained in a current line among the plurality of lines, there is no pixel assigned the same label as a label assigned to a pixel contained in the line scanned immediately before the current line, a feature point in a connected component formed by connecting the pixels assigned the same label together is extracted. Thus, by simply storing the labels of a plurality of lines (for example, two lines) of pixels, it is possible to perform labeling and feature point extraction simultaneously, it is possible to reduce the necessary memory capacity compared to a prior art, it is possible to realize the image processing as hardware, and it is possible to determine a similarity between images at high speed.

The present invention comprises adding means for adding up the coordinate values of the pixels assigned the same label when a determination is made that the same label was assigned, and means for storing the sum of the coordinate values of the pixels assigned the same label in association with each label. By extracting a feature point in a connected component formed by connecting the pixels assigned the same label together based on the sum of the coordinate values and the number of the pixels contained in the connected component, it is possible to extract a feature point in an arbitrary pattern. Moreover, it is possible to perform labeling and feature point extraction simultaneously, it is possible to reduce the necessary memory capacity compared to a prior art, and it is possible to accurately determine a similarity between images at high speed.

The present invention comprises binarizing means for calculating, for each pixel block composed of a plurality of pixels in an image, a threshold value based on the luminance values or lightness values of the pixels contained in the pixel block, and binarizing the image in the pixel block for which the threshold value was calculated, based on the calculated threshold value. Therefore, it is possible to realize the image processing as hardware, and it is possible to actively calculate a threshold value for binarization, stably specify a connected component, and accurately determine a similarity between images.

The present invention comprises means for calculating a statistic value of luminance values or lightness values based on the luminance values or lightness values of the respective pixels obtained by scanning the pixels in a pixel block in a predetermined direction, and means for storing the statistic value calculated for each scanning direction in the pixel block, and calculates the threshold value based on the statistic value stored for each of the scanning direction by the means. Thus, by simply storing the statistic value for each line in a pixel block, it is possible to perform the calculation of a statistic value for binarization and the binarization of the image in parallel for each pixel block.

In the present invention, by binarizing an image processed by means for performing a spatial filtering process to correct the spatial frequency characteristics of an image, it is possible to restore degradation of the image (for example, blurred image) even when a different image input apparatus is used. It is also possible to remove high frequency components which are not necessary to determine a similarity between images, and it is possible to accurately determine a similarity between images.

In the present invention, an image which was converted by means for converting the resolution of an image is binarized. Therefore, even when the resolution is changed, it is possible to extract a feature point in the binary image without being influenced by the change, and it is possible to accurately determine a similarity between images. Further, when the predetermined resolution is set smaller than the resolution in reading the image in the image input apparatus, it is possible to reduce the amount of processing in the subsequent stage.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory view showing an example of the filter factor of a filtering section;

FIG. 6 is a schematic view showing the structure of a buffer;

FIG. 9 is an explanatory view showing an example of a label equivalence table;

FIG. 10 is an explanatory view showing the structure of a coordinate value buffer;

FIGS. 11A to 11C are explanatory views showing an example of transition of a flag;

FIGS. 17A and 17B are explanatory views showing the structure of a hash table.

DETAILED DESCRIPTION

Figure 1:
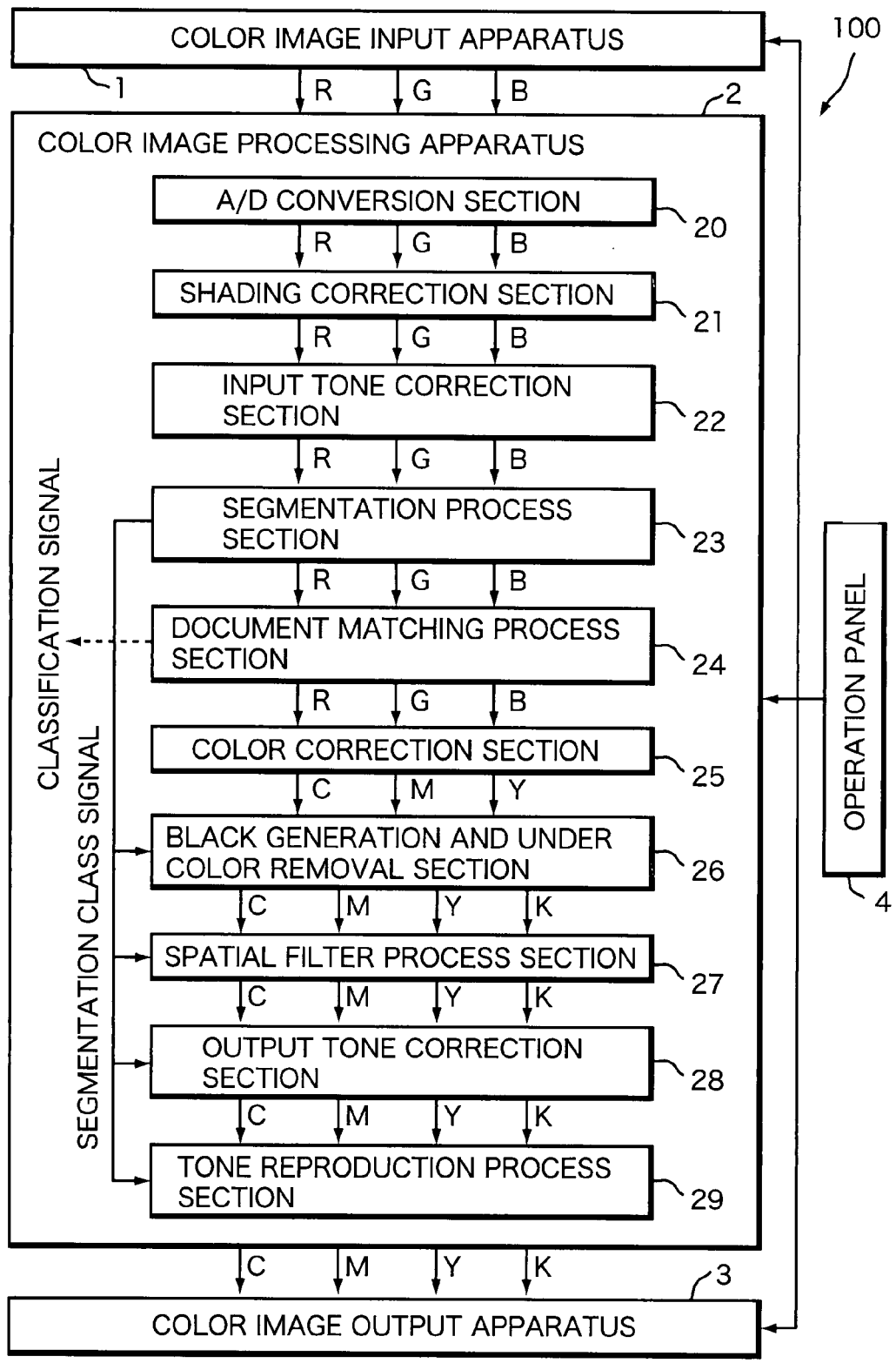
FIG. 1 is a block diagram showing the structure of an image forming apparatus comprising an image processing apparatus according to an embodiment.

The following will explain an embodiment based on the drawings. FIG. 1 is a block diagram showing the structure of an image forming apparatus 100 comprising an image processing apparatus according to this embodiment. The image forming apparatus 100 includes a color image input apparatus 1, a color image processing apparatus 2 (image processing apparatus), a color image output apparatus 3 as image forming means, and a operation panel 4 for performing various operations. Image data of RGB (R: red, G: green, B: blue) analog signals obtained by reading a document with the color image input apparatus 1 is outputted to the color image processing apparatus 2, undergoes predetermined processing in the color image processing apparatus 2, and is outputted to the color image output apparatus 3 as digital color signals representing CMYK (C: cyan, M: magenta, Y: yellow, K: black).

The color image input apparatus 1 is, for example, a scanner including a CCD (Charge Coupled Device), reads a reflected light image from the document image as RGB analog signals, and outputs the read RGB signals to the color image processing apparatus 2. The color image output apparatus 3 is an electrophotographic type or inkjet type printer for outputting the image data of the document image onto recording paper. The color image output apparatus 3 may be a display apparatus, such as a display.

The color image processing apparatus 2 is composed of later-described processing sections, and includes an ASIC (Application Specific Integrated Circuit).

An A/D conversion section 20 converts the RGB analog signals inputted from the color image input apparatus 1 into 10-bit digital signals, for example, and outputs the converted RGB signals to a shading correction section 21.

The shading correction section 21 performs a correction process on the inputted digital RGB signals to remove various types of distortion caused in a lighting system, an image focusing system, and an image sensing system, etc. of the color image input apparatus 1, and outputs the corrected RGB signals to an input tone correction section 22.

The input tone correction section 22 performs the process of adjusting the color balance and the process of removing an page background density or adjusting image quality, such as the contrast, on the inputted RGB signals (RGB reflectance signals). Moreover, the input tone correction section 22 performs the process of converting the RGB signals into signals such as density signals which are easily handled by an image processing system employed by the color image processing apparatus 2, and outputs the processed RGB signals to a segmentation process section 23.

The segmentation process section 23 segments the pixels of the input image into a character region, a halftone region, or a photo region, according to the inputted RGB signals. Based on the segmentation result, the segmentation process section 23 outputs segmentation class signal indicating to which regions the respective pixels belong to a black generation and under color removal section 26, a spatial filter process section 27, an output tone correction section 28, and a tone reproduction process section 29. The segmentation process section 23 also outputs the input signals as they are to a document matching process section 24 located in the subsequent stage.

The document matching process section 24 binarizes the input image, calculates a feature point in a specified connected component based on the binary image, and determines, based on the result, a similarity between the input image and a pre-registered image (including text image). When the document matching process section 24 determines that the images are similar to each other, it outputs a classification signal that specifies processing preset for the similar document, and performs predetermined processing. For example, when the input image is determined to be a similar document, the document matching process section 24 performs processing, such as canceling the output of the document, prohibiting copying of the document, and filing the document in a predetermined folder. Thus, it is possible to perform not only the matching of images (including text images), but also the processing according to the matching result. Moreover, the document matching section 24 outputs the inputted RGB signals as they are to a color correction section 25 located in the subsequent stage.

The color correction section 25 converts the inputted RGB signals into CMY color spaces, performs a color correction according to the characteristic of the color image output apparatus 3, and outputs the corrected CMY signals to the black generation and under color removal section 26. More specifically, in order to faithfully reproduce colors, the color correction section 25 removes color haze impurity on spectral characteristics of CMY color materials including useless absorption components.

The black generation and under color removal section 26 generates a K (black) signal based on the CMY signals inputted from the color correction section 25, subtracts the K signal from the inputted CMY signals to generate new CMY signals, and outputs the generated CMYK signals to a spatial filter process section 27.

An example of processing to be performed in the black generation under-color removing section 26 is illustrated. For example, when performing black generation by skeleton black, if the input/output characteristic of a skeleton curve is $y=f(x)$, the data to be inputted are C, M, and Y, the data to be outputted are C', M', Y', and K', and the UCR (Under-Color Removal) ratio is a $(0<\alpha<1)$, then the data to be outputted by the black generation under-color removing process are expressed by $K'=f\{\min(C, M, Y)\}$, $C'=C-\alpha K'$, $M'=M-\alpha K'$, and $Y'=Y-\alpha K'$.

For the CMYK signals inputted from the black generation and under color removal section 26, the spatial filter process section 27 performs special filtering process using a digital filter based on the region identification signal. Consequently, the spatial frequency characteristics of the image data are corrected, thereby preventing blur or granular degradation of the output image in the color image output apparatus 3. For example, in a region segmented as a character region by the segmentation process section 23, in order to particularly enhance the reproducibility of an achromatic text (black text) or a chromatic text (color text), the spatial filter process section 27 enhances high frequency components by performing an edge enhancement process. Moreover, the spatial filter process section 27 performs a low-pass filtering process to remove the inputted halftone components in a region segmented into a halftone region by the segmentation process section 23. The spatial filter process section 27 outputs the processed CMYK signals to the output tone correction section 28.

The output tone correction section 28 performs an output tone correction process for converting the CMYK signals inputted from the spatial filter process section 27 into a halftone area ratio that is a characteristic value of the color image output apparatus 3, and outputs to the tone reproduction process section 29 the CMYK signals after the output tone correction process.

The tone reproduction process section 29 performs predetermined processing on the CMYK signals inputted from the output tone correction section 28, based on the region identification signal inputted from the segmentation process section 23. For example, in order to particularly enhance the reproducibility of an achromatic text (black text) or a chromatic text, the tone reproduction process section 29 performs a binarizing process or a multi-level dithering process on the region segmented into a character region so that the region is suitable for the reproduction of high frequency components in the color image output apparatus 3.

Further, the tone reproduction process section 29 performs a tone reproduction process (halftone generation) on a region segmented into a halftone region in the segmentation process section 23 to finally separate the image into pixels and reproduce their gray levels. In addition, the tone reproduction process section 29 performs the binarizing process or the multi-level dithering process so that a region segmented into a photo region in the segmentation process section 23 is suitable for tone reproduction in the color image output apparatus 3.

The color image processing apparatus 2 stores temporarily the image data (CMYK signals) processed by the tone reproduction process section 29 in a storing section (not shown), reads the image data stored in the storing section at a predetermined timing of forming an image, and outputs the read image data to the color image output apparatus 3. The control of these operations is performed by a CPU (not shown), for example.

Figure 2:
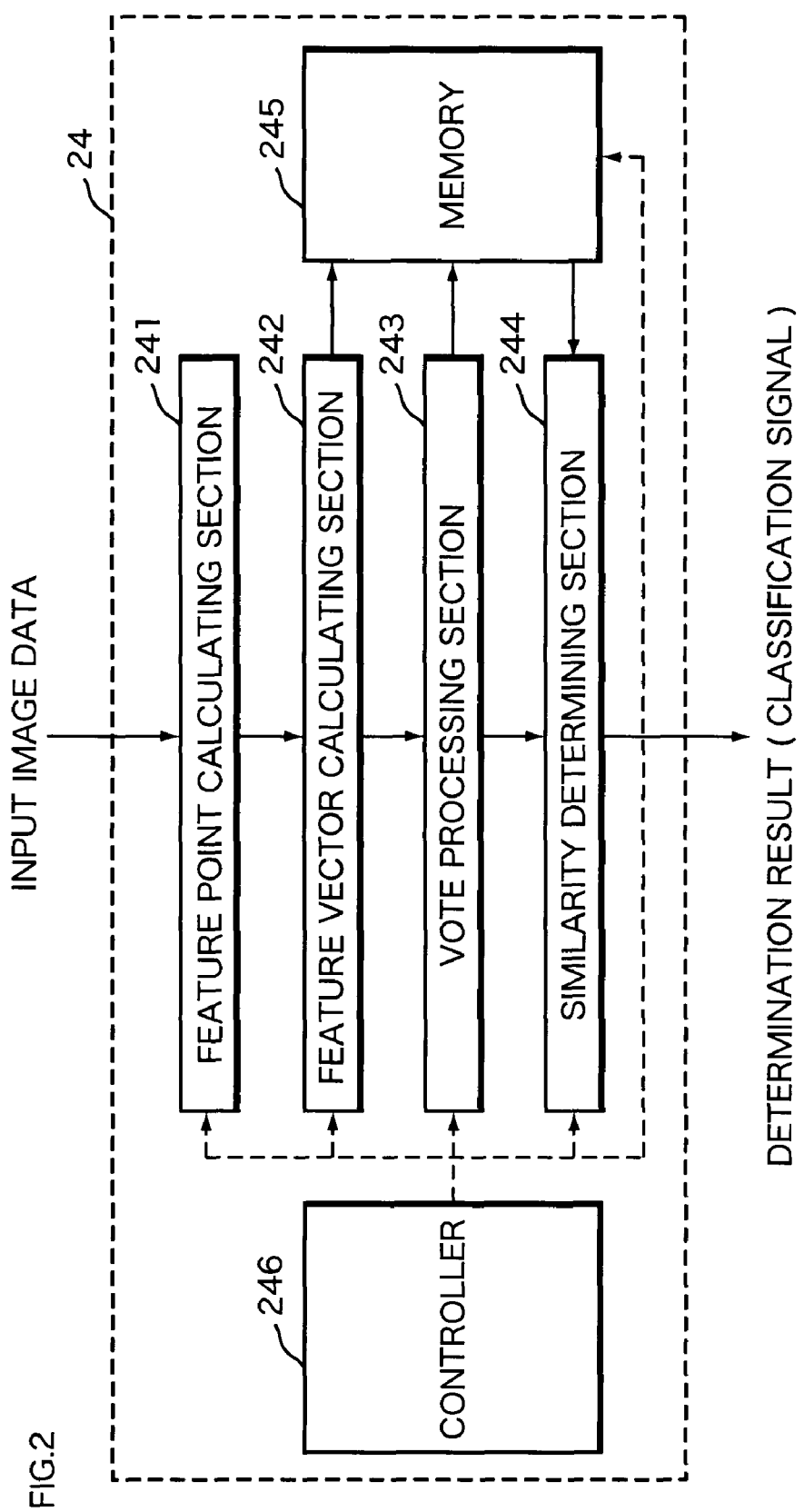
FIG. 2 is a block diagram showing the structure of a document matching process section.

FIG. 2 is a block diagram showing the structure of the document matching process section 24. The document matching process section 24 comprises a feature point calculating section 241, a feature vector calculating section 242, a vote processing section 243, a similarity determining section 244, a memory 245, and a controller 246 for controlling the above-mentioned respective sections.

The feature point calculating section 241 performs later-described predetermined processing on the input image, and also binarizes the input image, extracts (calculates) a feature point in a connected component specified based on the binary image (for example, a value obtained by adding up the coordinate values in the binary image of pixels constituting the connected component and dividing the sum of the coordinate values by the number of the pixels contained in the connected component), and outputs the extracted feature point to the feature vector calculating section 242.

Figure 3:
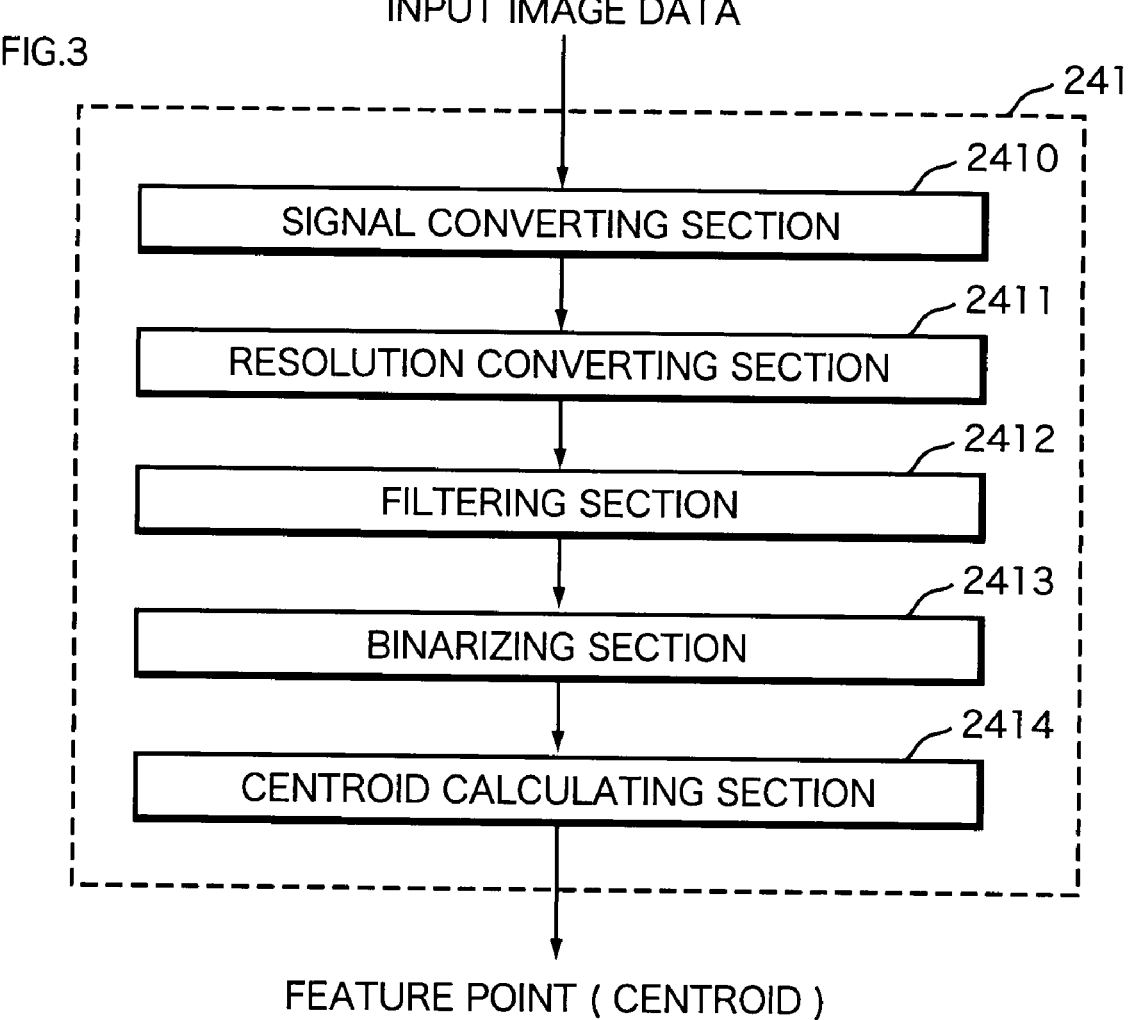
FIG. 3 is a block diagram showing the structure of a feature point calculating section.

FIG. 3 is a block diagram showing the structure of the feature point calculating section 241. The feature point calculating section 241 comprises a signal converting section 2410, a resolution converting section 2411, a filtering section 2412, a binarizing section 2413, and a centroid calculating section 2414.

When the input image is a color image, the signal converting section 2410 converting the color image into luminance signals or lightness signals, and outputs the converted image to the resolution converting section 2411. For example, a luminance signal Y can be expressed such that $Yj=0.30 \times Rj + 0.59 \times Gj + 0.11 \times Bj$, where Rj, Gj, and Bj are the color components of the respective pixels R, G and B, respectively, and Yj is the luminance signal of each pixel. Note that the present invention is not limited to the above equation, and it may be possible to convert the RGB signals into CIE1976L*a*b* signals.

Even when the input image is optically magnified by the color image input apparatus 1, the resolution converting section 2411 magnifies the input image again to a predetermined resolution, and then outputs the magnified image to the filtering section 2412. Therefore, even when the resolution is changed by the magnifying process performed in the color image input apparatus 1, it is possible to extract the feature point without being influenced by this change, and it is possible to accurately determine a similarity between images. In particular, in the case of a reduced character, when specifying a connected component by performing the binarizing process, it is possible to prevent a possibility that the connected component may be specified in a state in which originally separated regions are connected together because the character is squashed and that the centroid to be calculated may be displaced. Moreover, the resolution converting section 2411 converts the image into a resolution smaller than a resolution of the image read at equal magnification in the color image input apparatus 1. For example, the image read at 600 dpi (dot per inch) in the color image input apparatus 1 is converted into 300 dpi. Consequently, it is possible to reduce the amount of processing in the subsequent stage.

The filtering section 2412 corrects the spatial frequency characteristics of the input image (such as, for example, an enhancement process and a smoothing process for the image), and outputs the corrected image to the binarizing section 2413. Since the spatial frequency characteristics of the color image input apparatus 1 differ depending on the type of the apparatus, the filtering section 2412 corrects the different spatial frequency characteristics to desired characteristics. The image (for example, image signals) outputted by the color image input apparatus 1 suffers from degradation, such as blurred image, caused by the integrated effects of optical components including a lens or a mirror, the aperture degree of the light receiving surface of the CCD, the transfer efficiency, the residual image, and physical scanning, and scanning variations. The filtering section 2412 restores the degradation such as the blurred image by enhancing boundaries or edges. Moreover, the filtering section 2412 performs the smoothing process for restraining high frequency components which are unnecessary for the feature point extraction process performed in the subsequent stage. It is thus possible to accurately extract a feature point, and consequently it is possible to accurately determine a similarity between images.

FIG. 4 is an explanatory view showing an example of the filter factor of the filtering section 2412. As shown in FIG. 4, the spatial filter is a 7×7 (7 rows, 7 columns) mixed filter for performing the enhancement process and the smoothing process. The pixels in the input image are scanned, and a computing process using the spatial filter is executed on all the pixels. Note that the size of the spatial filter is not limited to 7×7, and may be 3×3, 5×5, etc. Further, the numerical value of the filter factor is merely one example, and the filter factor is not limited to this and can be suitably set according to the apparatus type or characteristics of the color image input apparatus 1 to be used.

The binarizing section 2413 binarizes the input image by comparing the luminance value (luminance signal) or the lightness value (lightness signal) of the image with a threshold value, and outputs the binarized binary image to the centroid calculating section 2414.

Figure 5:
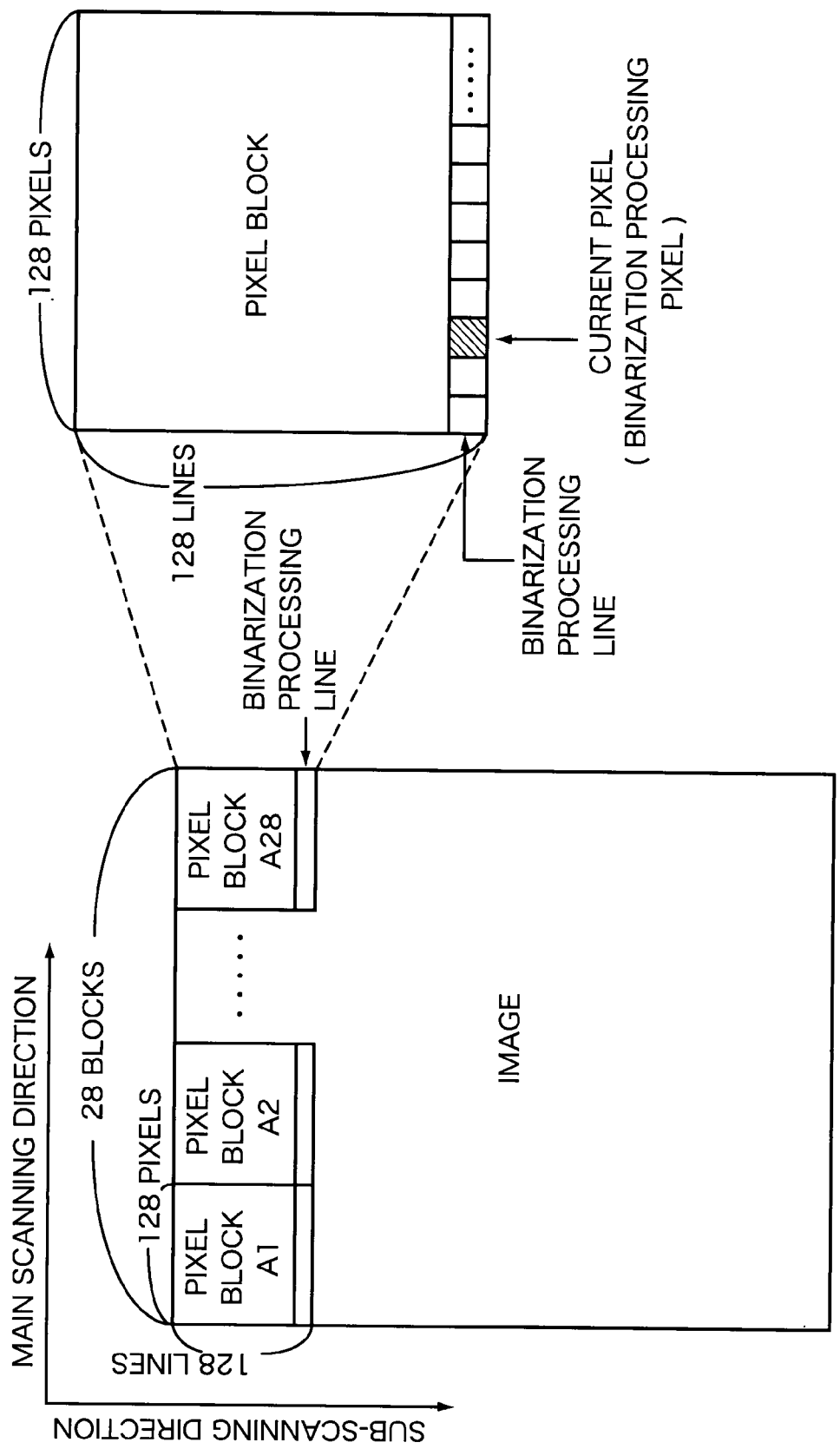
FIG. 5 is an explanatory view showing a binarizing process performed in a binarizing section.

FIG. 5 is an explanatory view showing the binarizing process performed by the binarizing section 2413. FIG. 5 shows an image on one page of a document, and the cross direction and the vertical direction based on the upper left of the image as the origin indicate a main scanning direction and a sub-scanning direction, respectively. There are 3584 pixels per line in the main scanning direction, and one line of the image in the main scanning direction is divided into 28 blocks represented by pixel blocks A1, A2, . . . , A28, each composed of 128×128 pixels.

The binarizing section 2413 comprises a buffer 2413a for storing, for each line, the mean value of the luminance values of 128 pixels contained in one line in the main scanning direction of the pixel blocks A1, A2, . . . , A28.

FIG. 6 is a schematic view showing the structure of the buffer 2413a. Since each of the pixel blocks A1, A2, . . . , A28 includes 128 lines, each line being composed of 128 pixels, the buffer 2413a stores the mean values for 128 lines, namely 128 mean values, for each of the pixel blocks A1, A2, . . . , A28. For example, as shown in FIG. 6, for the pixel block A1, the mean value of the luminance values of 128 pixels is stored on a line-by-line basis for 128 lines in the respective areas (1, 1), (2, 1), . . . , (128, 1).

The binarizing section 2413 calculates a threshold value for performing the binarizing process on each of the pixel blocks A1, A2, . . . , A28, and binarizes the image in each of the pixel blocks A1, A2, . . . , A28 by using a threshold value calculated for each of the pixel blocks A1, A2, . . . , A28. More specifically, the binarizing section 2413 calculates the mean value of the luminance values of the pixels (128 pixels) in the first one line in the main scanning direction for each of the pixel blocks A1, A2, . . . , A28, and stores the calculated mean values in the respective areas (1, 1), (1, 2), . . . , (1, 28) of the buffer 2413a. Consequently, in the buffer 2413a, 28 mean values are stored per line in the main scanning direction of the image.

The binarizing section 2413 moves onto one line below in the sub-scanning direction, calculates the mean value of the luminance values of the pixels (128 pixels) in the second line in the main scanning direction for each of the pixel blocks A1, A2, . . . , A28, and stores the calculated mean values in the respective areas (2,1), (2, 2), . . . , (2, 28) of the buffer 2413*a*. The binarizing section 2413 repeats the same processing for 128 lines in the sub-scanning direction. Consequently, the binarizing section 2413 stores the mean values corresponding to 128 lines for each of the pixel blocks A1, A2, . . . , A28.

The binarizing section 2413 further averages the mean values corresponding to 128 lines stored for each of the pixel blocks A1, A2, . . . , A28 to calculate a mean value, and uses the calculated mean value as a threshold value for the binarizing process. For example, the threshold value for the pixel block A1 is calculated by averaging the mean values stored in the respective areas (1, 1), (2, 1), . . . , (128, 1) of the buffer 2413*a*.

The binarizing section 2413 scans the current pixels in the image in the pixel blocks A1, A2, . . . , A28 in the main scanning direction and binarizes them based on the threshold values calculated for the pixel blocks A1, A2, . . . , A28, respectively. When the threshold calculation and the binarizing process are completed for the pixel blocks A1, A2, . . . , A28, the binarizing section 2413 repeats the same processing on the next 128 lines in the sub-scanning direction to binarize the entire image. Note that the threshold calculation is not limited to the structure using the mean value of luminance values, and it may be possible to use other statistic value such as the median value of luminance values.

With the use of the buffer 2413*a*, since it is not necessary to use a large-capacity storage memory compared to calculating a threshold value by referring to the luminance values of pixels in a wide range of regions of the entire image, it is possible to realize the image processing as hardware. Moreover, a threshold value is actively calculated for each pixel block of a desired size. Therefore, when specifying a connected component based on the binary image, it is possible to stably specify a connected component without being influenced by a change caused by the characteristics of the color image input apparatus such as a scanner, and the page background of the document itself. Consequently, it is possible to accurately calculate a feature point (for example, the centroid) of the connected component, and it is possible to improve the accuracy of determining a similarity between images. Further, since the threshold calculation and the binarizing process are performed in parallel for each pixel block, it is possible to perform the binarizing process at high speed even when the threshold value is actively calculated.

The centroid calculating section 2414 comprises later-described label buffer 2414*a*, coordinate value buffer 2414*b* and label equivalence table, and performs labeling (the label assigning process) on each pixel based on binary information (for example, indicated by "1", "0") about each pixel in the binary image inputted from the binarizing section 2413, specifies a connected component where pixels assigned the same label are connected together, extracts the centroid in the specified connected component as a feature point, and outputs the extracted feature point to the feature vector calculating section 242. Note that the feature point can be expressed by coordinate values (x coordinate, y coordinate) in the binary image.

Figure 7:
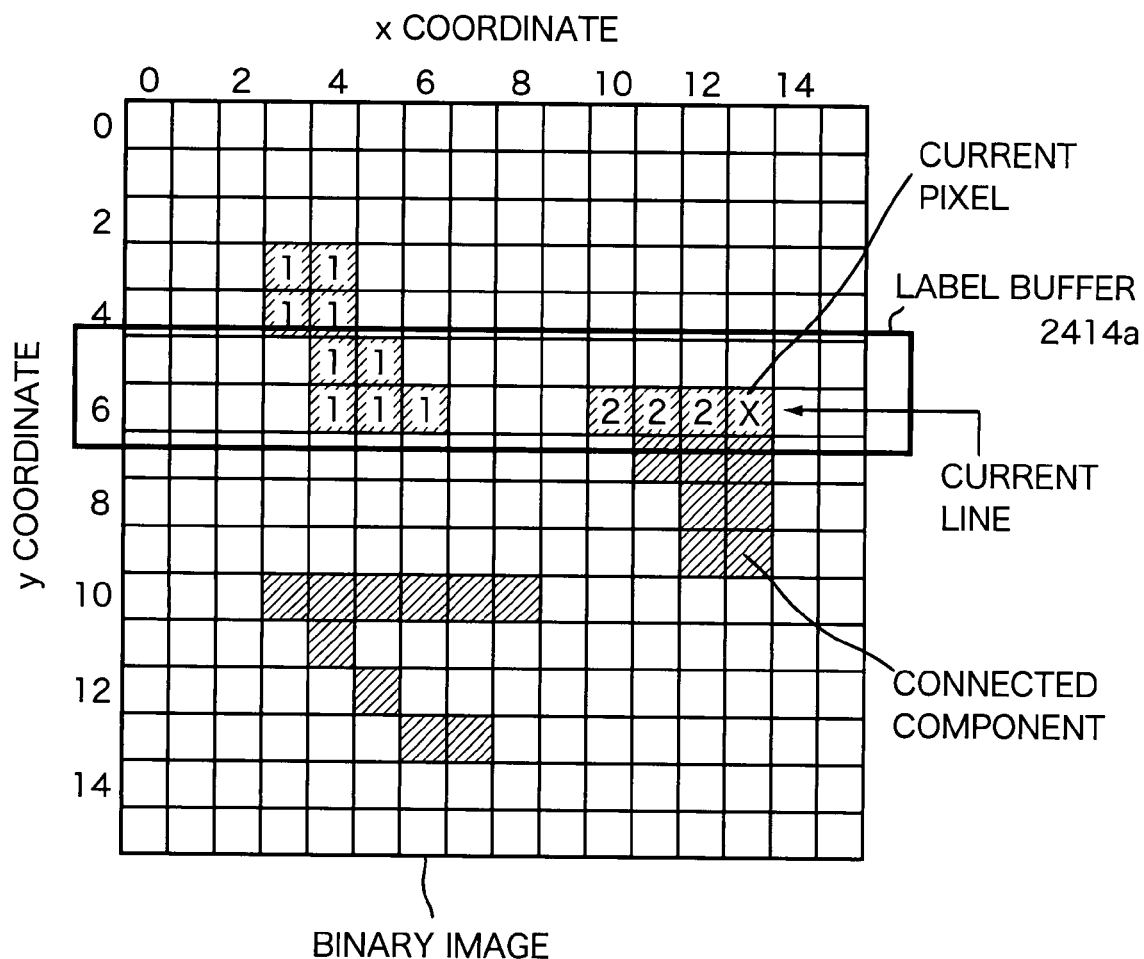
FIG. 7 is an explanatory view showing a centroid calculating (feature point extraction) process performed in a centroid calculating section.

FIG. 7 is an explanatory view showing a centroid calculation (feature point extraction) process performed in the centroid calculating section 2414. In FIG. 7, although the image is shown in the size of 16×16 pixels to simplify the explanation, the actual image has a size of, for example, 3584×3584 pixels. The centroid calculating section 2414 comprises a label buffer 2414*a* for storing the labels of pixels (16×2=32 pixels in FIG. 7) contained in two lines (a current line and a line processed immediately before the current line) along the main scanning direction of the binary image.

Figure 8:
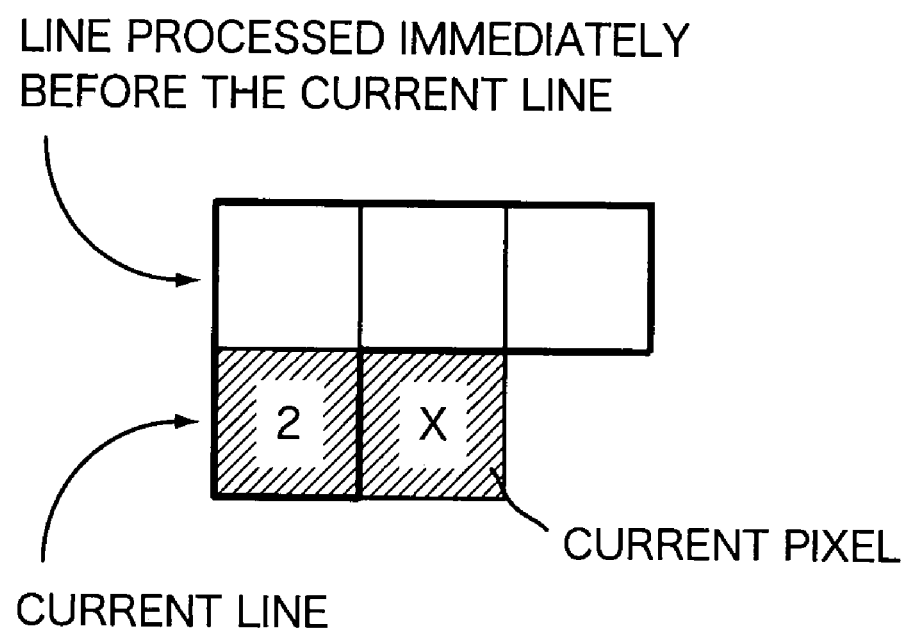
FIG. 8 is an explanatory view showing an example of neighboring pixels for use in a label assigning process in the centroid calculating section.

FIG. 8 is an explanatory view showing an example of neighboring pixels for use in the label assigning process in the centroid calculating section 2414. As shown in FIG. 8, when assigning a label by scanning the current pixel in the main scanning direction, a total of four adjacent pixels, including an adjacent pixel processed immediately before the current pixel and three adjacent pixels contained in the line processed immediately before the current line, are labeled as the neighboring pixels of the current pixel. Note that the example of neighboring pixels is not limited to this, and it may be possible to select other adjacent pixels.

The centroid calculating section 2414 determines whether or not all neighboring pixels adjacent to the current pixel in the current line have been labeled. If they have not been labeled, the centroid calculating section 2414 assigns an unused label to the current pixel (for example, assigns the label "3" if the labels "1" and "2" have been used), and stores the assigned label in the label buffer 2414*a* corresponding to the current pixel.

On the other hand, when the neighboring pixels adjacent to the current pixel have already been assigned the same label, the centroid calculating section 2414 assigns the same label to the current pixel, and stores the assigned label in the label buffer 2414*a* corresponding to the current pixel.

When the neighboring pixels adjacent to the current pixel have already been assigned different labels, the centroid calculating section 2414 assigns the oldest label among the different labels to the current pixel, and stores the assigned label in the label buffer 2414*a* corresponding to the current pixel. In this case, in order to record the fact that different labels are the same, the centroid calculating section 2414 records the labels into a label equivalence table and integrates the labels. When integrating the labels, the centroid calculating section 2414 also integrates the coordinate values of the pixels and the number of the pixels.

Figure 9:
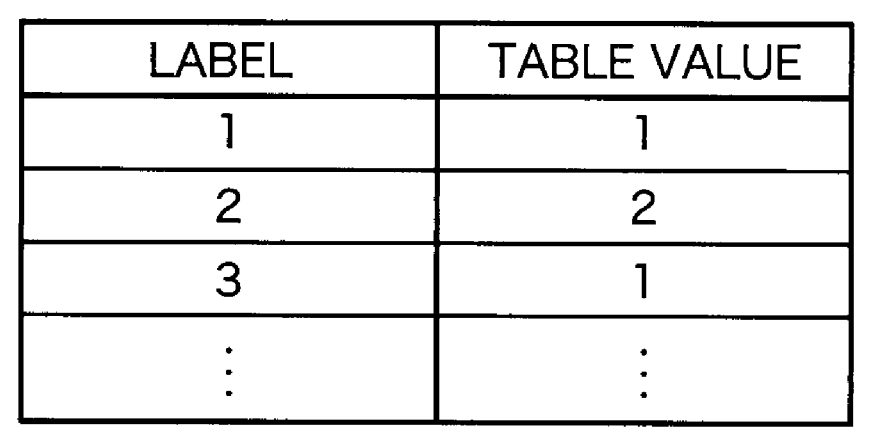

FIG. 9 is an explanatory view showing an example of the label equivalence table. As shown in FIG. 9, the label equivalence table includes columns of label and table value, and shows, for example, that the label "3" and the label "1" are the same label if a table value corresponding to the label "3" is "1". Therefore, a pixel assigned the label "3" is integrated into a pixel assigned the label "1".

Thus, the centroid calculating section 2414 can perform the label assigning process by simply including the label buffer 2414*a* for two lines. Consequently, there is no need to use such a large-capacity memory as one used in a prior art for storing the labels of all the pixels in the binary image, and it is possible to realize the label assigning process for the binary image as hardware.

The centroid calculating section 2414 performs the process of calculating the centroid in a connected component by adding up the coordinate values of the pixels contained in the connected component simultaneously with the label assigning process, based on the labels of two lines of pixels stored in the label buffer 2414*a*.

FIG. 10 is an explanatory view showing the structure of a coordinate value buffer 2414*b*. The coordinate value buffer 2414*b* includes columns of label, number of pixels, the sum of x coordinate values, the sum of y coordinate values, and flag. The number of pixels, the sum of x coordinate values, the sum of y coordinate values, and the flag are stored in association with each label. The number of pixels indicates the number of the pixels in a connected component where pixels assigned the same label are connected together. The sum of x coordinate values and the sum of y coordinate values are values obtained by adding up respectively the x coordinate values and the y coordinate values of the pixels contained in the connected component.

The flag indicates the state of a label by classifying the state into "available", "processed", or "unprocessed". "available" indicates a state in which the label is not used. "processed" indicates a state in which the label has been assigned to a current pixel in a current line, and "unprocessed" indicates a state in which the label was not assigned to a current line.

The number of pixels, the sum of x coordinate values, the sum of y coordinate values, and the flag corresponding to each of the labels "1" and "2" in FIG. 10 indicate a state when the processing on the sixth current line in FIG. 7 has been completed. For example, the following is an explanation about nine pixels assigned the label "1" in FIG. 7. It is clear from FIG. 7 that the number of pixels assigned the label "1" is nine. The sum of x coordinate values of the pixels assigned the label "1" is (3+4)+(3+4)+(4+5)+(4+5+6)=38. The sum of y coordinate values of the pixels assigned the label "1" is (3+3)+(4+4)+(5+5)+(6+6+6)=42. Since the label "1" was assigned to three pixels when the processing on the current line was completed, the flag indicates "processed".

The following is an explanation about four pixels assigned the label "2" (label "2" is assigned to a current pixel X) in FIG. 7. It is clear from FIG. 7 that the number of pixels assigned the label "2" is four. The sum of x coordinate values of the pixels assigned the label "2" is (10+11+12+13)=46. The sum of y coordinate values of the pixels assigned the label "2" is (6+6+6+6)=24. Since the label "2" was assigned to four pixels when the processing on the current line was completed, the flag indicates "processed".

By storing the flag for each label, the centroid calculating section 2414 can determine whether or not the cumulative addition of the coordinate values was performed when the processing on one line (current line) was completed.

FIGS. 11A to 11C are explanatory views showing an example of the transition of the flag. FIG. 11A shows the flag when the processing on the current line (sixth line) in FIG. 7 was completed. As described above, since the labels "1" and "2" were assigned to the pixels of the current line when the processing on the current line was completed, the flag indicates "processed".

Next, the centroid calculating section 2414 deletes the labels of the pixels of the line (fifth line) processed immediately before the current line (sixth line), which are stored in the label buffer 2414a, and stores the labels of the pixels of the current line (sixth line) in the deleted region. Then, the centroid calculating section 2414 can take the seventh line as a new current line and store the labels of the pixels of the current line.

Before starting the processing on the seventh line as a new current line, the centroid calculating section 2414 initializes the flag of each label. With the initialization, as shown in FIG. 11B, the flag "unprocessed" is set for the labels "1" and "2". Note that an unused label is initialized with the flag "available".

As shown in FIG. 7, since there is no pixel assigned the label "1" on the seventh line, the connected component composed of the pixels assigned the label "1" ends at the seventh line. On the other hand, since there are pixels assigned the label "2" on the seventh line (there are pixels adjacent to the pixels assigned the label "2" on the sixth line), the connected component composed of the pixels assigned the label "2" continues to the seventh line. Thus, as shown in FIG. 11C, the label "1" has not been assigned, but the label "2" was assigned to the pixels in the current line when the processing on the current line (seventh line) was completed. Accordingly, the flag "1" remains "unprocessed", and the flag "2" indicates "processed".

Hence, the centroid calculating section 2414 determines that the coordinate values of the pixels of the label "1" were not added up, and that the coordinate values of the pixels of the label "2" were added up, when the processing on the current line (seventh line) was completed. According to the determination that the coordinate values of the pixels of the label "1" were not added up, the centroid calculating section 2414 divides each of the sum of the x coordinate values and the sum of the y coordinate values corresponding to the label "1", which are stored in the coordinate value buffer 2414b, by the number of the pixels to calculate the centroid of the connected component composed of the pixels assigned the label "1". For example, in the case of FIG. 7, the x coordinate of the centroid in the connected component of the label "1" is x coordinate=4.22 by dividing 38 as the sum of x coordinate values by 9 representing the number of the pixels, and the y coordinate of the centroid is y coordinate=4.67 by dividing 42 as the sum of y coordinate value by 9 representing the number of the pixels.

The centroid calculating section 2414 releases the label "1" assigned to the pixels in the connected component whose centroid was calculated. Consequently, the flag of the label "1" becomes available and can be used again as a new label, and thus it is possible to effectively use the memory capacity of the coordinate value buffer 2414b.

By performing the processing as described above, even when a large number of connected components are present in the entire binary image, it is possible to perform the label assigning process and the centroid calculation process (feature point extraction process) simultaneously by just using a limited memory capacity, namely the label buffer 2414a for two lines and the coordinate value buffer 2414b. Therefore, it is possible to reduce the necessary memory capacity compared to the prior art, it is possible to realize the image processing as hardware, and it is possible to determine a similarity between images at high speed. Moreover, it is possible to calculate the centroid irrespective of the shape of the connected component, and it is possible to accurately determine a similarity between images.

Figure 12:
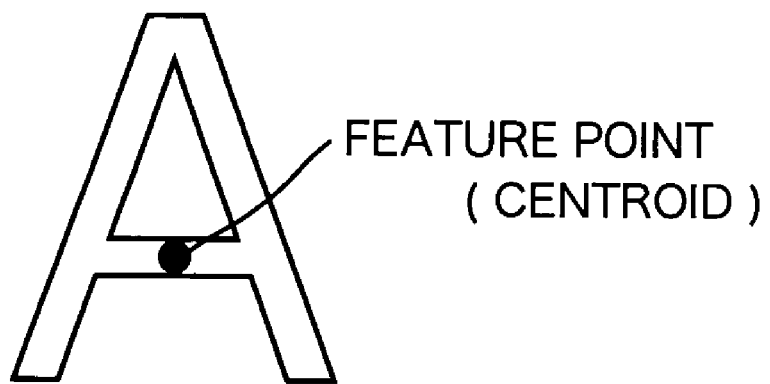
FIG. 12 is an explanatory view showing an example of a feature point in a connected component.

FIG. 12 is an explanatory view showing an example of a feature point in a connected component. In FIG. 12, the specified connected component is the character "A", and is specified as a set of pixels assigned the same label. A feature point (centroid) of the character "A" is the position (x coordinate, y coordinate) indicated by the black circle in FIG. 12.

Figure 13:
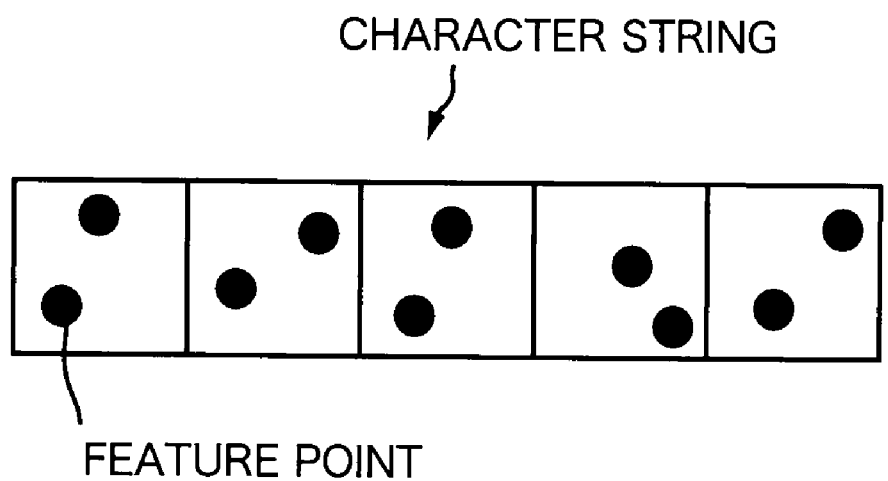
FIG. 13 is an explanatory view showing an example of the result of extracting feature points in a character string.

FIG. 13 is an explanatory view showing an example of the result of extracting feature points for a character string. In the case of a character string composed of a plurality of characters, a plurality of feature points having different coordinates depending on the types of the characters are extracted.

The feature vector calculating section 242 takes each of the feature points (namely, the coordinate values of the centroids of the connected component) inputted from the feature point calculating section 241 as a current feature point, and selects, for example, four other surrounding feature points within a short distance from the current feature point.

Figure 14:
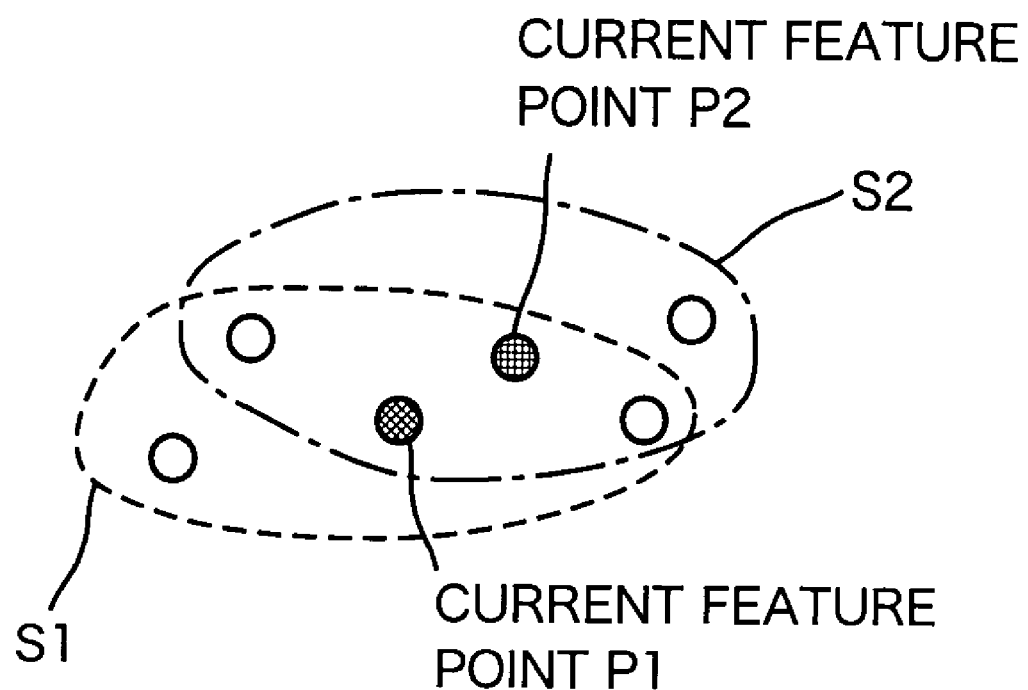
FIG. 14 is an explanatory view showing current feature points and surrounding feature points.

FIG. 14 is an explanatory view showing current feature points and surrounding feature points. As shown in FIG. 14, for a current feature point P1, for example, four feature points enclosed by a closed curved line S1 are selected (a current feature point P2 is also selected as a feature point for the current feature point P1). For the current feature point P2, for example, four feature points enclosed by a closed curved line S2 are selected (the current feature point P1 is also selected as a feature point for the current feature point P2).

The feature vector calculating section 242 selects three feature points from the selected four feature points, and calculates an invariant. Note that the feature points to be selected are not limited to three, and it may be possible to select four or five feature points. The number of feature points to be selected varies depending on the type of invariant to be found. For example, the invariant found from three points is an analog invariant.

Figure 15A:
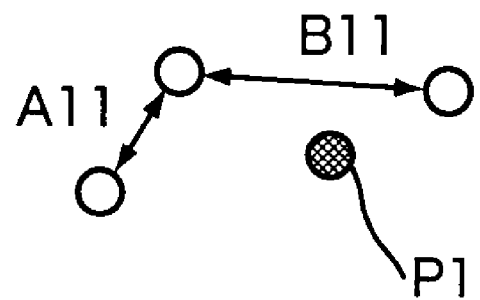
FIGS. 15A to 15C are explanatory views showing an example of calculating an invariant based on the current feature points.
Figure 15B:
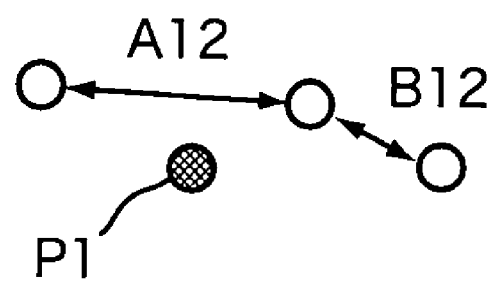
Figure 15C:
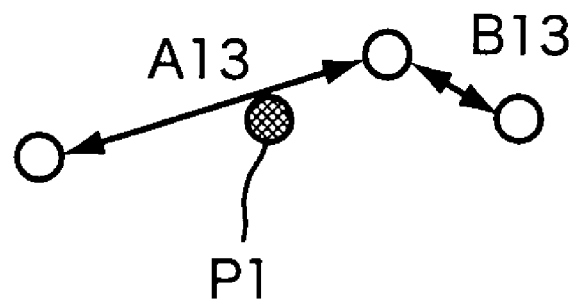
Figure 16A:
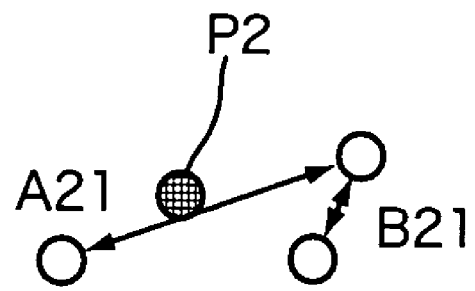
FIGS. 16A to 16C are explanatory views showing an example of calculating an invariant based on the current feature points.
Figure 16B:
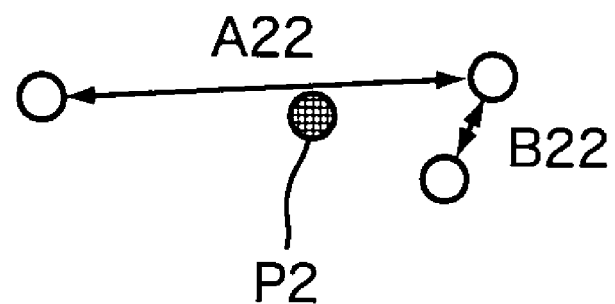
Figure 16C:
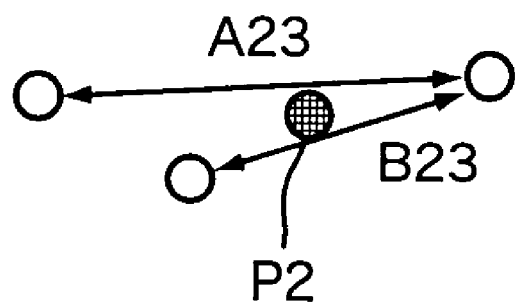

FIGS. 15A to 15C are explanatory views showing an example of calculating an invariant based on the current feature point P1. FIGS. 16A to 16C are explanatory views showing an example of calculating an invariant based on the current feature point P2. As shown in FIGS. 15A to 15C, three feature points are selected from four feature points surrounding the current feature point P1, and three different invariants are written H1$j$ ($j$=1, 2, 3). A feature vector representing a feature of the image is a vector which contains the invariant H11, H12 and H13 as vector elements. The invariant H1$j$ is calculated by the equation H1$j$=(A1$j$/B1$j$)×C/D. Here, A1$j$ and B1$j$ indicate the distances between the feature points, C is a normalized constant, and D is a predetermined constant. Therefore, for example, even when the document is rotated, moved, or tilted, the invariant Hij does not change, and it is possible to accurately determine a similarity between images.

Similarly, as shown in FIGS. 16A to 16C, three feature points are selected from four feature points surrounding the current feature point P2, and three different invariants are written H2$j$ ($j$=1, 2, 3). A feature vector representing a feature of the image is a vector which contains the invariant H21, H22 and H23 as vector elements. The invariant H2$j$ is calculated by the equation H2$j$=(A1$j$/B1$j$)×C/D. Here, A2$j$ and B2$j$ indicate the distances between the feature points, C is a normalized constant, and D is a predetermined constant. It is possible to calculate invariants for other current feature points in the same manner.

The feature vector calculating section 242 calculates a hash value Hi, based on the invariants calculated from the respective current feature points. The hash value Hi of the current feature point Pi is expressed as Hi=(Hi1×10$^2$+Hi2×10$^1$+Hi3×100)/E. Here E is a constant determined by how much remainder is set, and, for example, when E is "10", the remainder is in a range of "0" to "9", which is the range of values the hash value to be calculated can take. Here, i is a natural number. Note that the above-mentioned hash value representing the feature vector is one example, and the present invention is not limited to this and may use other hash function. Although an example of extracting four points as other surrounding feature points is illustrated above, the feature points to be extracted is not limited to four points. For example, it may be possible to extract six points. In this case, five points are extracted from six feature points, an invariant is found and a hash value is calculated by extracting three points from the five points for each of six methods of extracting five points.

FIGS. 17A and 17B are explanatory views showing the structure of a hash table. As shown in FIG. 17A, the structure of the hash table includes columns of hash value and index representing a document. More specifically, a point index indicating a position in the document, and an invariant are registered in association with an index representing a document. In order to determine a similarity between images, images or document images to be matched are registered in the hash table beforehand. The hash table is stored in the memory 245. As shown in FIG. 17B, when hash values are equal to each other (H1=H5), it may be possible to group two entries in the hash table into one.

The vote processing section 243 searches for the hash table stored in the memory 245, based on the hash value calculated by the feature vector calculating section 242, and votes for documents with indexes registered for the hash value. The vote processing section 243 outputs the result of adding up the votes to the similarity determining section 244.

The similarity determining section 244 determines a similarity of documents (images, or document images), based on the voting result inputted from the vote processing section 243, and outputs the determination result (classification signal). More specifically, the similarity determining section 244 compares the number of votes inputted from the vote processing section 243 with a predetermined threshold value, determines that the input image is similar to a pre-registered document image when the number of votes is greater than the threshold value, and further determines that a document with the highest vote among the images determined to be similar is a matching document. The similarity determining section 244 outputs a classification signal to perform processing (such as, for example, prohibition of copying, or storing of the result in a predetermined folder) determined for the registered document according to the determination result. When the number of votes inputted from the vote processing section 243 is smaller than the threshold value, the similarity determining section 244 determines that there is no similar document, and outputs the result. The above-mentioned determination method is one example, and it may be possible to use other methods such as, for example, a method in which a determination of a similarity or a determination of a matching document is made after performing normalization by dividing the vote by the highest vote for each document (such as the number of feature points found for each document).

Next, the operation of the document matching process section 24 will be explained. The feature point calculating section 241 performs the threshold calculation for the binarizing process and the binarizing process on an image in parallel for each pixel block by using a pixel block of a predetermined size with respect to the input image, performs the label assigning process based on the binary image and the feature point extraction (centroid calculation) for a connected component in parallel for each current line, and outputs the extracted feature points to the feature vector calculating section 242.

The feature vector calculating section 242 calculates a predetermined invariant, based on the feature points inputted from the feature point calculating section 241, calculates a hash value based on the calculated invariant, and outputs the calculated hash value to the vote processing section 243.

The vote processing section 243 searches for the hash table stored in the memory 245, based on the hash value calculated by the feature vector calculating section 242, and votes for documents with indexes registered for the hash value. The result of adding up the votes is outputted to the similarity determining section 244.

The similarity determining section 244 compares the number of votes inputted from the vote processing section 243 with a predetermined threshold value, determines that the input image is similar to a pre-registered document image when the number of votes is greater than the threshold value, and further determines that a document with the highest vote among the documents determined to be similar is a matching document. The similarity determining section 244 outputs a classification signal to perform processing (such as, for example, prohibition of copying, or storing the result in a predetermined folder) determined for the registered document according to the determination result. When the number of votes inputted from the vote processing section 243 is smaller than the threshold value, the similarity determining section 244 determines that there is no similar document, and outputs the result. The above-mentioned determination method is one example, and it may be possible to use other methods such as, for example, a method in which a determination of a similarity or a determination of a matching document is made after performing normalization by dividing the vote by the highest vote for each document (such as the number of feature points found for each document).

As explained above, in this embodiment, by simply storing the labels for two lines of pixels, it is possible to perform labeling and the feature point extraction simultaneously, it is possible to reduce the necessary memory capacity compared to a prior art, it is possible to realize the image processing as hardware, and it is possible to determine a similarity between images at high speed. Moreover, it is possible to extract feature points for an arbitrary pattern, and it is possible to accurately determine a similarity between images. Further, it is possible to actively find a threshold value for the binarizing process, accurately determine a similarity between images by stably specifying a connected component, and it is also possible to simultaneously perform the threshold calculation for the binarizing process and the binarization of the image for each pixel block. In addition, even when a different image input apparatus is used, it is possible to restore the degradation of the image (such as, for example, blurred image), remove high frequency components which are not necessary to determine a similarity between images, and accurately determine a similarity between images. Further, even when the resolution is changed, it is possible to extract feature points in the binary image without being influenced by the change, and it is possible to accurately determine a similarity between images. When the predetermined resolution is set smaller than the resolution at the time of reading the image in the image input apparatus, it is possible to reduce the amount of processing in the subsequent stage.

In the above-described embodiment, for example, a flat bed scanner, a film scanner, a digital camera, or a cell phone may be used as the color image input apparatus 1. As the color image output apparatus 3, it may be possible to use, for example, an image display apparatus such as a CRT display and a liquid crystal display, an electrophotographic type or inkjet type printer for outputting the processing result onto recording paper. Further, as the image forming apparatus 100, it may be possible to use a modem that is communication means for connecting to a server apparatus through a network. It may also be possible to use a structure in which color image data is acquired from an external storage apparatus, a server apparatus, etc., through a network, instead of acquiring color image data from the color image input apparatus 1.

In the above-described embodiment, although the color image input apparatus 1 and the color image processing apparatus 2 are explained as separate apparatuses, it may be possible to integrate the color image processing apparatus 2 into the color image input apparatus 1 to construct an image reading apparatus.

In the above-described embodiment, the document matching process section 24 includes the memory 245 and the controller 246. However, the present invention is not limited to this structure, and it may be possible to provide the memory 245 and the controller 246 outside the document matching process section 24.

In the above-described embodiment, although the label buffer stores labels for two lines, the present invention is not limited to two lines, and it may be possible to store labels for three or more lines. Note that the storage capacity can be made smaller by constructing the label buffer to store labels for two lines.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
a label storing section for storing sequentially, for each of a plurality of lines along a predetermined direction, information about labels, which were assigned to pixels according to binarization information about pixels by scanning pixels of a binary image obtained by binarizing an image in the predetermined direction;
a coordinate value storing section for storing information about coordinate values of pixels assigned the same label in the binary image; and
a controller capable of performing operations of:
determining whether or not, in a current line among the plurality of lines, there is a pixel assigned the same label as a label assigned to a pixel contained in a line which was scanned immediately before the current line;
when a determination is made that there is no pixel assigned the same label, calculating a feature point in a connected component of the image where pixels specified by the coordinate values and assigned the same label are connected together, based on the information about the coordinate values stored in said coordinate value storing section;
calculating a feature vector representing a feature of the image based on the calculated feature point; and
determining a similarity to a reference image based on the calculated feature vector,
wherein the labels are assigned to the pixels according to binarization information about the respective pixels by:
determining, for each current pixel of the binary image scanned in the predetermined direction, whether or not neighboring pixels adjacent to the current pixel in the current line and the line which was scanned immediately before the current line have been assigned a label;
in the case where none of the neighboring pixels have been assigned a label, assigning a unused label to the current pixel;
in the case where one or more of the neighboring pixels have been assigned the same label, assigning the same label to the current pixel; and
in the case where one or more of the neighboring pixels have been assigned different labels, assigning an oldest label among the different labels to the current pixel.

2. The image processing apparatus according to claim 1, wherein said controller is further capable of performing operations of adding up the coordinate values of pixels assigned the same label and storing the sum in said coordinate value storing section when a determination is made that there is a pixel assigned the same label in the current line; and
calculating the feature point based on the information about the sum of the coordinate values in said coordinate value storing section and the number of the pixels assigned the same label.

3. The image processing apparatus according to claim 2, wherein the feature point is calculated by dividing the sum of the coordinate values by the number of the pixels assigned the same label, and the feature point corresponds to a centroid of the connected component.

4. The image processing apparatus according to claim 1, wherein said controller is further capable of performing operations of calculating, for each pixel block composed of a plurality of pixels, a threshold value based on luminance values or lightness values of the pixels contained in the pixel block; and binarizing the image in the pixel block based on the calculated threshold value.

5. The image processing apparatus according to claim 4, wherein said controller is further capable of performing operations of calculating a statistic value of luminance values or lightness values based on the luminance values or lightness values of the respective pixels obtained by scanning the pixels in the pixel block in the predetermined direction; and calculating the threshold value based on the calculated statistic value.

6. The image processing apparatus according to claim 1, further comprising a spatial filter process section for performing a spatial filtering process to correct spatial frequency characteristics of an image.

7. The image processing apparatus according to claim 1, further comprising a resolution converting section for converting a resolution of an image.

8. An image forming apparatus comprising:
an image processing apparatus defined in claim 1; and
an image forming section for forming on a sheet an image processed by said image processing apparatus.

9. An image reading apparatus comprising:
an image reading section for reading an image; and
an image processing apparatus defined in claim 1 for processing the image read in said image reading section.

10. An image processing apparatus comprising:
a label assigning section for scanning pixels of a binary image obtained by binarizing an image in a predetermined direction and assigning labels to the pixels according to binarization information about the respective pixels;
a label storing section for storing information about the assigned labels sequentially for each of a plurality of lines along the predetermined direction;
a coordinate value storing section for storing information about coordinate values of pixels assigned the same label in the binary image;
a determining section for determining whether or not, in a current line among the plurality of lines, there is a pixel assigned the same label as a label assigned to a pixel contained in a line which was scanned immediately before the current line;
a feature point calculating section for calculating a feature point in a connected component of the image where pixels specified by the coordinate values and assigned the same label are connected together, based on the information about the coordinate values stored in said coordinate value storing section, when a determination is made that there is no pixel assigned the same label;
a feature vector calculating section for calculating a feature vector representing a feature of the image based on the calculated feature point; and
a similarity determining section for determining an similarity to reference image based on the calculated feature vector,
wherein assigning labels to the pixels according to binarization information about the respective pixels comprises:

determining, for each current pixel of the binary image scanned in the predetermined direction, whether or not neighboring pixels adjacent to the current pixel in the current line and the line which was scanned immediately before the current line have been assigned a label;
in the case where none of the neighboring pixels have been assigned a label, assigning a unused label to the current pixel;
in the case where one or more of the neighboring pixels have been assigned the same label, assigning the same label to the current pixel; and
in the case where one or more of the neighboring pixels have been assigned different labels, assigning an oldest label among the different labels to the current pixel.

11. The image processing apparatus according to claim 10, further comprising a cumulative adder section for adding up the coordinate values of pixels assigned the same label when a determination is made that there is a pixel assigned the same label in the current line, wherein
the feature point is calculated based on the information about the sum of the coordinate values and the number of the pixels assigned the same label.

12. The image processing apparatus according to claim 11, wherein the feature point is calculated by dividing the sum of the coordinate values by the number of the pixels assigned the same label, and the feature point corresponds to a centroid of the connected component.

13. The image processing apparatus according to claim 10, further comprising a threshold value calculating section for calculating, for each pixel block composed of a plurality of pixels, a threshold value based on luminance values or lightness values of the pixels contained in the pixel block; and
a binarizing section for binarizing the image in the pixel block based on the calculated threshold value.

14. The image processing apparatus according to claim 13, wherein a statistic value of the luminance values or lightness values is calculated based on the luminance values or lightness values of the respective pixels obtained by scanning the pixels in the pixel block in the predetermined direction, and the threshold value is calculated based on the calculated statistic value.

15. The image processing apparatus according to claim 10, further comprising a spatial filter process section for performing a spatial filtering process to correct spatial frequency characteristics of an image, wherein
the image whose spatial frequency characteristics were corrected by said spatial filter process section is binarized.

16. The image processing apparatus according to claim 10, further comprising a resolution converting section for converting a resolution of an image, wherein
the image whose resolution was converted by said resolution converting section is binarized.

17. An image forming apparatus comprising:
an image processing apparatus defined in claim 10; and
an image forming section for forming on a sheet an image processed by said image processing apparatus.

18. An image reading apparatus comprising:
an image reading section for reading an image; and
an image processing apparatus defined in claim 10 for processing the image read in said image reading section.

19. An image processing method comprising the steps of:
scanning pixels of a binary image obtained by binarizing an image in a predetermined direction, and assigning labels to the pixels according to binarization information about the respective pixels;

storing information about the assigned labels sequentially for each of a plurality of lines along the predetermined direction;

storing information about coordinate values of pixels assigned the same label in the binary image;

determining whether or not, in a current line among the plurality of lines, there is a pixel assigned the same label as a label assigned to a pixel contained in a line which was scanned immediately before the current line;

when a determination is made that there is no pixel assigned the same label, calculating a feature point in a connected component of the image where pixels specified by the coordinate values and assigned the same label are connected together, based on the stored information about the coordinate values;

calculating a feature vector representing a feature of the image based on the calculated feature point; and determining a similarity to a reference image based on the calculated feature vector, wherein assigning labels to the pixels according to binarization information about the respective pixels comprises:

determining, for each current pixel of the binary image scanned in the predetermined direction, whether or not neighboring pixels adjacent to the current pixel in the current line and the line which was scanned immediately before the current line have been assigned a label;

in the case where none of the neighboring pixels have been assigned a label, assigning a unused label to the current pixel;

in the case where one or more of the neighboring pixels have been assigned the same label, assigning the same label to the current pixel; and in the case where one or more of the neighboring pixels have been assigned different labels, assigning an oldest label among the different labels to the current pixel.

* * * * *